United States Patent [19]

Azzopardi et al.

[11] Patent Number: 4,754,848
[45] Date of Patent: Jul. 5, 1988

[54] LUBRICATION DEVICES

[75] Inventors: Benjamin E. Azzopardi; Barry J. Koppen, both of South Johnstone, Australia

[73] Assignee: Castrol Limited, England

[21] Appl. No.: 44,668

[22] Filed: May 1, 1987

[30] Foreign Application Priority Data

May 1, 1986 [AU] Australia .................. PH05694

[51] Int. Cl.⁴ .............................................. F01M 1/08
[52] U.S. Cl. ................................. 184/6.26; 184/6.14; 184/29
[58] Field of Search ............... 184/6.26, 6.14, 39.1, 184/55.2, 29

[56] References Cited

U.S. PATENT DOCUMENTS

| 1,943,102 | 1/1934 | Woodruff | 184/29 X |
| 2,616,523 | 11/1952 | Davis | 184/29 X |
| 3,490,560 | 1/1970 | Hierta | 184/6.26 |
| 3,955,647 | 5/1976 | Tine | 184/39.1 |
| 4,205,708 | 6/1980 | Burgbacher | 184/6.26 |

FOREIGN PATENT DOCUMENTS

| 2540146 | 5/1976 | Fed. Rep. of Germany | 184/6.26 |
| 848160 | 10/1939 | France | 184/29 |

Primary Examiner—Leonard E. Smith
Attorney, Agent, or Firm—Bacon & Thomas

[57] ABSTRACT

A lubrication system for supplying viscous, solvent-based, lubricants to heavy industrial plant, such as a driving gear of a sugar mill comprises a reciprocating lubricant pump which is periodically actuated to deliver lubricant to a spray head. Air is supplied under pressure to the spray head to effect discharge of the viscous lubricant in spray form. The air supply continues for a pre-determined time after discharge of the lubricant to evaporate solvent in the lubricant and also to clean the spray device. The pump effects a single stroke for each cyclic discharge of lubricant.

1 Claim, 4 Drawing Sheets

LUBRICATION DEVICES

The present invention relates to lubrication devices, and more particularly to lubrication devices for use with relatively viscous lubricants designed for heavy duty industrial use.

Heavy industrial plant such as ball mills, kilns, and sugar mills often comprises large diameter exposed driving gears. A sugar mill, for example, may comprise a series of crushing rollers about 7 feet in length and 4 feet in diameter, driven by exposed gears perhaps 8 feet in diameter with the gear teeth having a root depth of 6 inches. For many years it has been the practice to lubricate large diameter exposed gears by immersing the lower part of the gear in a sump containing a bitumastic or other heavy lubricant, the lubricant being picked up by the gear teeth as the gear rotates. With this system, the lubricant tends to be splashed around, leading to high consumption of lubricant and pollution of the adjacent environment, necessitating the need for frequent cleaning.

Recent developments in lubricants have resulted in the production of heavy duty industrial lubricants for exposed gears and other uses and which permit considerably reduced lubricant consumption. A typical heavy duty industrial lubricant as is now available may comprise graphite and molybdenum disulphide, together with polymers and gelling agents which provide tackiness and adhesion to enable the lubricant to stay on the gear teeth surfaces in all attitudes. Such a lubricant may be sprayed onto the gear, and to assist application by spraying the lubricant also contains a solvent which evaporates rapidly after application to the gear.

It has been proposed to apply this type of lubricant using airless spray equipment. Such equipment generally comprises a reciprocating pump having a relatively high reciprocation rate and a relatively complex electronic control system to control the lubricant spraying cycles. Apart from the relatively high cost of such equipment, the pump has been found to be prone to substantial wear as a result of its high speed of operation and of the presence of certain additives in the lubricant.

According to the present invention, there is provided a lubrication system for use with relatively viscous lubricants, comprising a pump for supplying lubricant to a discharge device, control means for effecting periodic actuation of the pump so that lubricant is supplied periodically to the discharge device, and means for supplying air under pressure to the discharge device to effect discharge of lubricant in spray form.

Preferably, the air is supplied to the discharge means for a predetermined time after cessation of the lubricant supply, whereby to clean the discharge means and to evaporate solvent present in the lubricant previously sprayed onto equipment adjacent thereto.

Preferably, the pump is a reciprocating pump actuated pneumatically, the actuating air for the pump and the air for the discharge means being from a common supply of pressurised air.

An embodiment of the invention will now be described, by way of example only, with reference to the accompanying drawings, in which.

The lubrication system to be described is primarily intended for use with a solvent-containing sprayable heavy duty lubricant of the type discussed above. It is to be noted that although such a lubricant is of lower viscosity than conventional bitumastic-type lubricants referred to earlier, it is still a relatively viscous lubricant.

Figure 1:
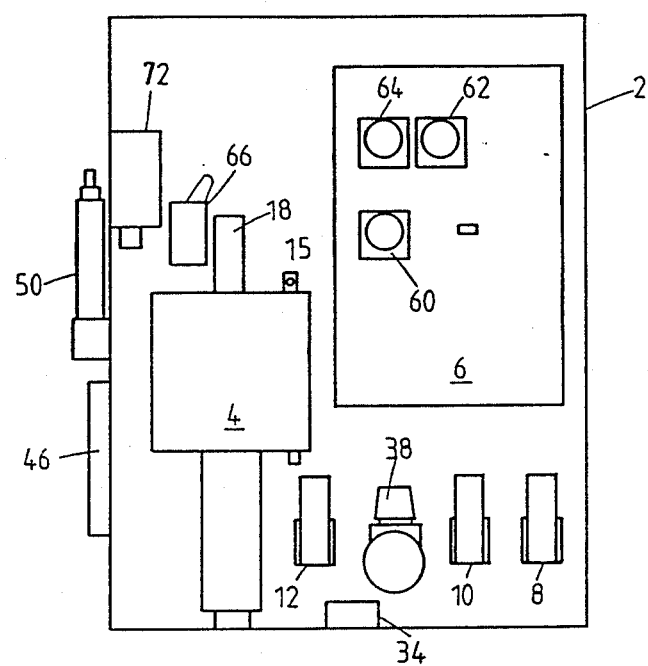
FIG. 1 is a schematic front elevation of a lubrication system in accordance with a preferred embodiment of the invention.

With initial reference to FIG. 1, the system comprises a cabinet 2 housing a pneumatically-actuated lubricant pump 4, an electrical control unit 6, and solenoid-operated valves 8, 10, 12 for controlling supply of compressed air to the pump and to an external spray bar located adjacent an exposed gear or other equipment to be lubricated.

Figure 2:
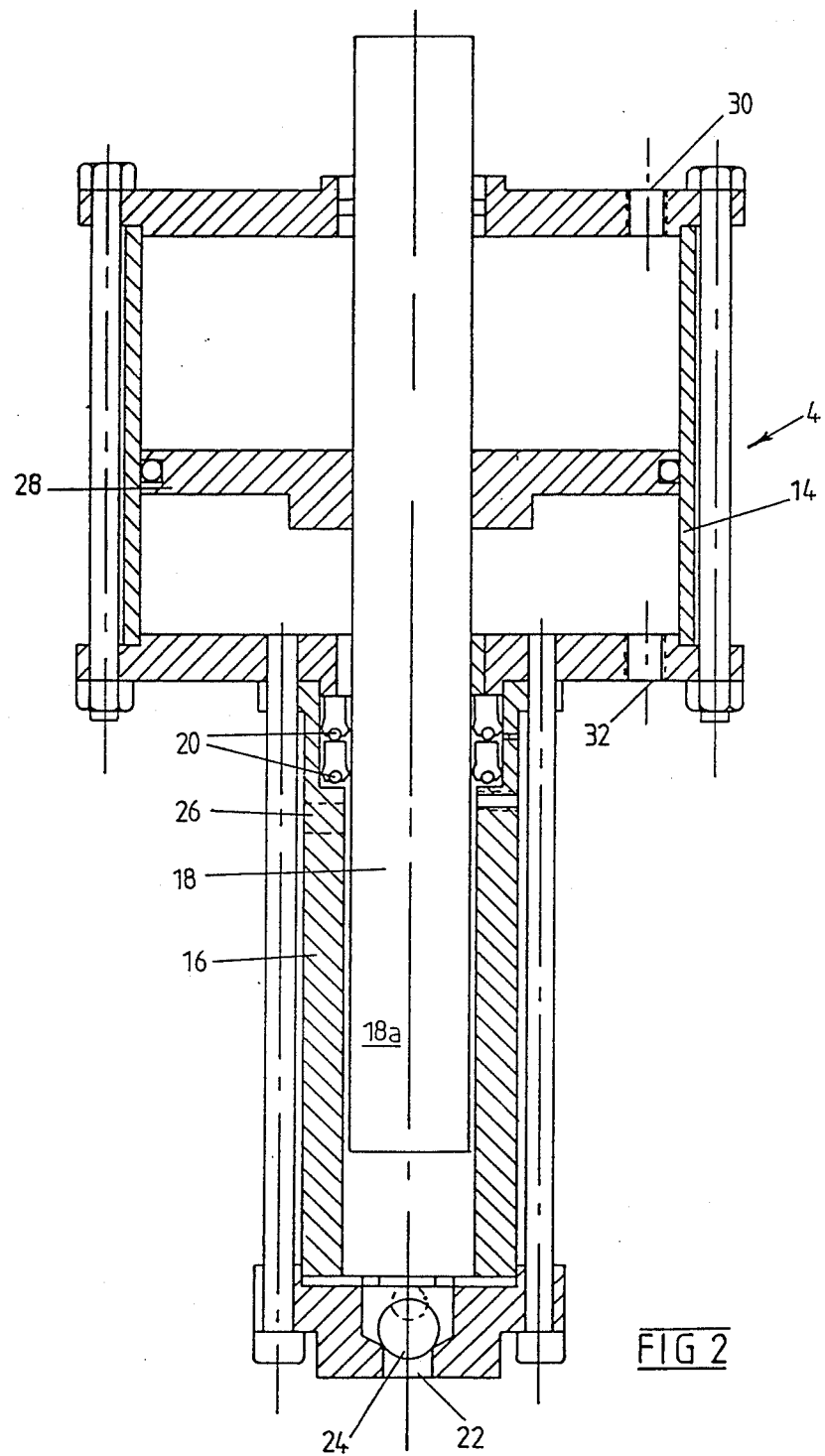
FIG. 2 is a longitudinal section of a pump of the system.

As shown in FIG. 2, the pump 4 is a reciprocating pump having a body defining a large-diameter actuating cylinder 14 and a small diameter pumping cylinder 16. A piston rod 18 projects through an upper wall of the actuating cylinder 14 to pass through the cylinder 14 and into the pumping cylinder 16, the lower end portion of the piston rod 18 constituting a pumping piston 18a within the pumping cylinder 16. Seals 20 interposed between the pump body and the piston rod 18 at the upper end of the pumping cylinder 16 prevent fluid communication between the actuating and pumping cylinders 14, 16. A lubricant inlet 22 at the lower end of the pump body communicates with the pumping cylinder 16 via a one-way ball valve 24. The inlet 22 is adapted to communicate with an inlet pipe (not shown) which passes through a bottom wall of the cabinet 2 from a lubricant drum beneath the cabinet. A lubricant outlet 26 extends from the upper part of the pumping cylinder 16. The piston rod 18 carries an actuating piston 28 within the actuating cylinder 14. Air inlet/outlet ports 30, 32 communicate with the actuating cylinder space above and below the piston 28, respectively.

Figure 3:
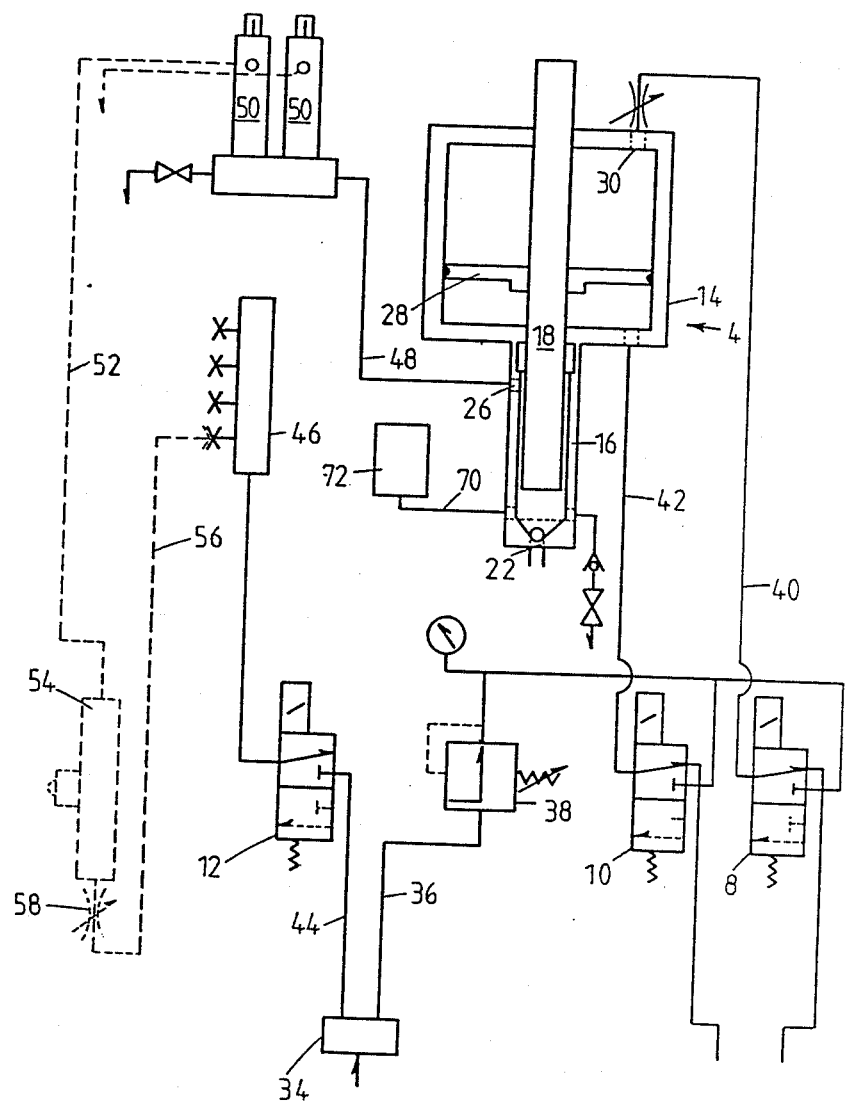
FIG. 3 is an overall circuit diagram of the system.

With reference to FIG. 3, an air inlet manifold 34 adapted for connection to an external supply of compressed air has a first line 36 leading via an adjustable pressure regulator 38 to the solenoid-operated valves 8, 10. The valve 8 is connected by a line 40 to the inlet/outlet port 30, and the valve 10 is connected by a line 42 to the inlet/outlet port 32. The valves 8, 10 are sliding distributor valves and can be switched to selectively connect the associated inlet/outlet port to the air supply, or to exhaust. Switching of the valves is effected by the control unit 6 as will be described later. A second line 44 leads from the inlet manifold 34 to a nozzle air supply manifold 46 via the solenoid-operated valve 12. The valve 12 is switched by means of the control unit 6 to selectively supply air to the manifold 46.

The lubricant outlet 26 from the pump 4 leads via a line 48 to a number of injectors 50 typically having an injection pressure of around 1200 psi. An external line 52 leads from each injector 50 to a respective spray bar 54 located in the vicinity of the gear or other equipment to be lubricated. An airline 56 leads from the manifold 46 to each respective spray bar 54 via an adjustable throttle valve 58.

Control of the lubrication system is effected by means of the control unit 6 which acts to switch the valves 8, 10, 12 in a predetermined sequence and at adjustable intervals. In this regard, the lubricant does not need to be continually applied during operation of the equipment, but instead is applied at regular intervals (for example intervals of up to 60 mins.) depending on the type of equipment.

Figure 4:
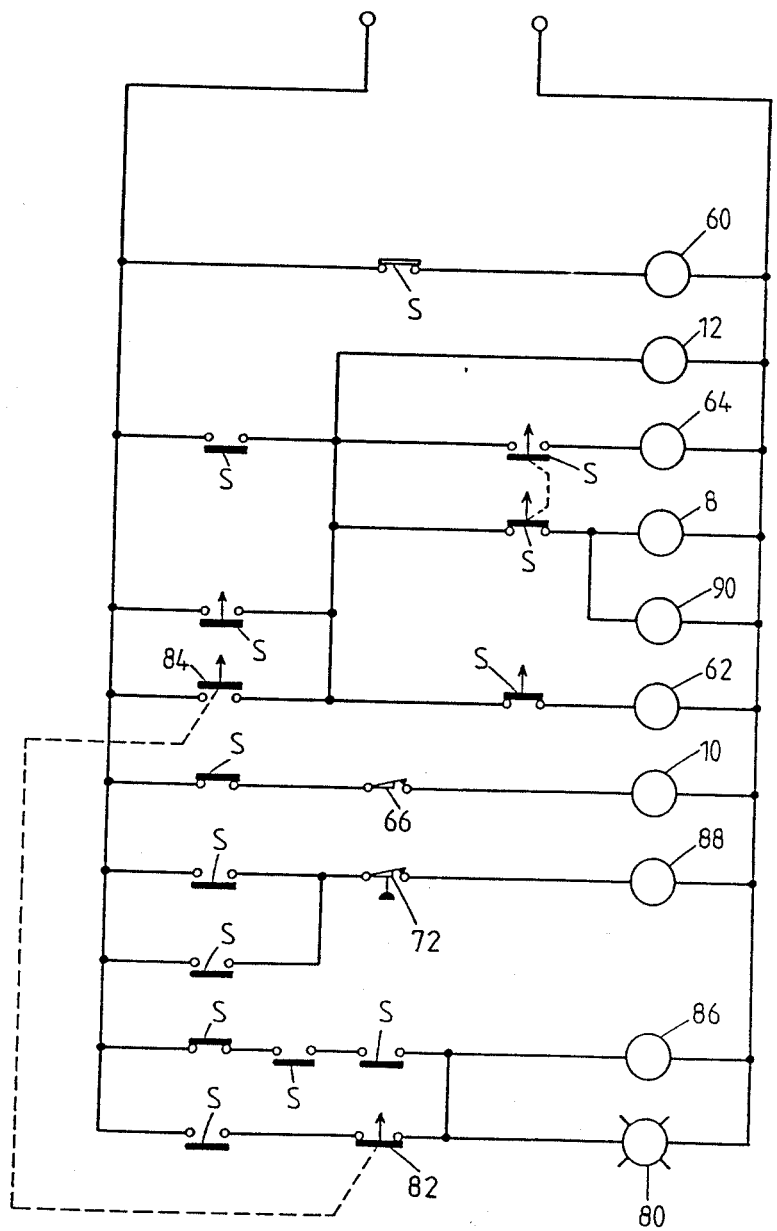
FIG. 4 is a circuit diagram of an electrical control unit of the system.

FIG. 4 shows the basic circuitry of the control unit. The unit includes a main timer 60 which can be set to provide a selected interval between applications of lubricant; the timer 60 may be infinitely variable to provide the selected interval of up to 60 mins. as mentioned above. Secondary variable timers 62, 64 are used to control operation of the valves 8 and 12 during lubrication, as will be described. A limit switch 66 actuated by the piston rod 18 at the upper end of its stroke also controls the valves 8 and 10 as will be described.

The system operates as follows.

At the start of a lubrication cycle as determined by timing out of the timer 60, the valve 10 is switched to supply compressed air to the port 32, and the valve 8 is switched to connect the port 30 to exhaust. The air supplied into the actuating cylinder 14 via the port 30 causes the piston 28 and piston rod 18 to be displaced upwardly whereby lubricant is drawn into the pumping cylinder 16 via the inlet 22 and one-way valve 24. At the upper end of its stroke, the piston rod 18 engages the limit switch 66 which effects switching of the valves 8 and 10 so that the port 30 is now connected to receive compressed air and the port 32 is connected to exhaust. Thus the piston 28 and piston rod 18 are forced downwardly to cause lubricant to be displaced from the pumping cylinder through the outlet 26 to the injectors 50 and thence to the spray bar 54. At the same time, the valve 12 is switched to cause compressed air to be supplied to the manifold 46 and then to the spray bar 54 to effect spraying of the lubricant.

The timer 62 is set to a time which ensures that compressed air is applied to the port 30 for a sufficient time to permit the lubricant to be fed to, and to actuate, the injectors 50, this being necessary due to the viscous nature of the lubricant. The adjustability of the timer 62 permits the system to be adjusted for different number of injectors and/or different viscosities of lubricant. When the timer 62 times out, the valve 8 is switched to open the port 30 to exhaust.

The timer 64 which controls the solenoid valve 12 is set to permit a continued supply of air to the spray bar for a selected time after the timer 62 has timed out and the supply of lubricant under pressure to the spray bar has ceased. The continuing supply of air has the effect of cleaning the nozzles in the spray bar and also causing rapid evaporation of the solvent in the lubricant previously sprayed onto the equipment. When the timer 64 times out, the valve 12 is switched to terminate the air supply to the manifold 46. The valves 8, 10 12 are thus in the states illustrated in FIG. 3, and the system is in readiness for the next cycle upon subsequent timing out of the timer 60.

The pumping cylinder 16 is connected by a line 70 to a pressure-sensitive switch 72. If, during the downwards pumping stroke of the pump 4, insufficient pressure is developed in the cylinder 16 to charge the injectors, for example due to the lubricant drum being empty so that insufficient or no lubricant was drawn into the cylinder during the preceding up-stroke, the switch triggers an alarm 80 in the unit 6, and possibly also at a remote location, in order to warn of failure of the lubrication system. A monitoring device may also be provided to monitor the power supply to the system and to actuate an alarm in the event of power failure.

Many of the components are shown in the circuit diagram of FIG. 4 which is purely schematic as the detailed circuitry is not critical to the invention and can be readily be determined by those skilled in the art. In addition to the components already described, the circuit includes alarm reset and cycle test switches 82, 84, alarm relays 86, 88, a control relay 90 associated with the valve 8 and switches generally indicated by S associated with various timers, solenoids and relays.

The system described is relatively simple and of inexpensive construction, and the pump is subject to very low wear rates as the piston rod assembly only moves through a single forward and reverse (upwards and downwards) stroke during each cycle of actuation, the movement itself being a relatively slow speed movement.

The embodiment has been described by way of example only, and modifications are possible within the scope of the invention.

I claim:

1. A lubrication system for use with viscous lubricants, comprising a nozzle adjacent equipment to be lubricated, an airline leading from a source of pressurized air to the nozzle, a lubricant line leading to the nozzle separately from the airline, a lubricant pump for pumping lubricant into the lubricant line, said lubricant pump comprising a pumping cylinder and a reciprocatory pumping piston in the pumping cylinder, a lubricant inlet leading into the pumping cylinder, and a lubricant outlet from the pumping cylinder, said outlet being connected to the lubricant line, an actuating cylinder of substantially larger diameter than the pumping cylinder, and a reciprocatory actuating piston in the actuating cylinder, said actuating piston being rigidly coupled with the pumping piston, pump actuating airline means leading from the source of pressurized air to the actuating cylinder, valve means controlling the air flow through the actuating airline means such that pressurized air is fed to the actuating cylinder at one side of the actuating piston to cause the actuating piston to move the pumping piston in a direction to draw lubricant into the pumping cylinder via the inlet and the air is then fed to the actuating cylinder at the other side of the actuating piston to cause the actuating piston to move the pumping piston in the opposite direction whereby to force the lubricant under pressure from the outlet of the pumping cylinder and into the lubricant line, first adjustable timer means associated with the valve means for controlling the valve means to effect a cycle of operation of the pump at an adjustable periodic interval, said cycle consisting of only a small number of strokes of the actuating and pumping pistons, air valve means for controlling the air supply to the nozzle via the airline, and second adjustable timer means for controlling the air valve means to supply air to the nozzle for an adjustable period after the end of the pumping stroke.

* * * * *